(12) United States Patent
Viklund et al.

(10) Patent No.: US 8,096,455 B2
(45) Date of Patent: Jan. 17, 2012

(54) SINGLE FORCE STRUT FOR DUAL SIDED CARGO BOX

(75) Inventors: Mark Viklund, New Milford, CT (US); Vincent Bove, Bethlehem, CT (US)

(73) Assignee: Thule Sweden AB, Hillerstorp (SE)

( * ) Notice: Subject to any disclaimer, the term of this patent is extended or adjusted under 35 U.S.C. 154(b) by 1354 days.

(21) Appl. No.: 10/711,912

(22) Filed: Oct. 12, 2004

(65) Prior Publication Data

US 2005/0145639 A1 Jul. 7, 2005

Related U.S. Application Data

(60) Provisional application No. 60/481,491, filed on Oct. 9, 2003.

(51) Int. Cl.
*B60R 9/055* (2006.01)

(52) U.S. Cl. .................................................. 224/328

(58) Field of Classification Search .............. 224/328, 224/404, 309; 220/830, 827; 16/286, 333, 16/339, 284, 290, 291, 312, 239; 49/279, 49/333, 386
See application file for complete search history.

(56) References Cited

U.S. PATENT DOCUMENTS

| | | | |
|---|---|---|---|
| 1,331,556 A | 2/1920 | Blood | |
| 1,345,261 A | 6/1920 | Sellek | |
| 2,483,947 A * | 10/1949 | Turner | 220/830 |
| 2,656,563 A * | 10/1953 | Jones | 16/327 |
| 3,432,967 A * | 3/1969 | Simon | 220/326 |
| 3,640,423 A * | 2/1972 | Parker et al. | 220/324 |
| 4,295,245 A | 10/1981 | Malcom | |

(Continued)

FOREIGN PATENT DOCUMENTS

DE 192269 A 9/1906

(Continued)

OTHER PUBLICATIONS

Performance XPORT Xcess Cargo Box assembly instructions, May 4, 2003.*

(Continued)

*Primary Examiner* — Justin Larson
(74) *Attorney, Agent, or Firm* — Novak Druce + Quigg LLP

(57) ABSTRACT

Arrangement for providing and controlling operation of a dual sided opening roof mount cargo box (10) for a carrying vehicle. A dual sided opening roof mount cargo box (10) is provided and which has a lid portion (30) releasably hinge-connected at two lateral sides to a bottom portion (32) of the cargo box (10) for alternate pivotation at each of the two lateral sides between open and closed configurations. The bottom portion (32) is adapted to be mounted to a carrying vehicle and the lid portion (30) is manufactured from a semi-flexible material sufficiently pliable to permit two opposite end regions thereof to be at different relative distances from the bottom portion (32) of the cargo box (10) during transition between the open and closed configurations. A pair of spring-biased struts (50) are also provided, each operatively interposed between the lid portion (30) and the bottom portion (32) of the cargo box (10), and one each of the pair of spring-biased struts (50) being located at the two opposite end regions of the cargo box. An expansively directed force is imposed on the lid portion (30), utilizing the pair of spring-biased struts (50), across a substantial entirety of travel of the lid portion (30) during operator induced movement from the closed configuration to the open configuration and thereby assisting the operator to smoothly open the cargo box (10).

17 Claims, 4 Drawing Sheets

U.S. PATENT DOCUMENTS

| | | | |
|---|---|---|---|
| 4,738,329 A | | 4/1988 | Gauer |
| 4,829,712 A | | 5/1989 | Itoh |
| 4,873,791 A | * | 10/1989 | Lyons, Sr. ........................ 49/386 |
| 5,029,362 A | | 7/1991 | Prodan |
| 5,357,376 A | * | 10/1994 | Yoshida ........................ 359/844 |
| 5,546,705 A | * | 8/1996 | Hirtsiefer ...................... 220/830 |
| 6,463,627 B1 | * | 10/2002 | Hirtsiefer ........................ 16/286 |
| 6,845,547 B2 | * | 1/2005 | Ham ................................ 16/374 |
| 7,240,974 B2 | * | 7/2007 | Hirtsiefer ...................... 312/109 |

FOREIGN PATENT DOCUMENTS

| | | | |
|---|---|---|---|
| DE | 694865 C1 | | 8/1940 |
| DE | 2016287 A | | 10/1971 |
| DE | 2800985 A1 | | 7/1979 |
| DE | 26 53 106 A1 | | 1/1984 |
| DE | 299 03 503 U1 | | 1/1999 |
| EP | 0047826 A1 | | 3/1982 |
| EP | 0422678 A1 | | 4/1991 |
| FR | 1222294 A | | 6/1960 |
| FR | 2864838 A1 | * | 7/2005 |
| GB | 527160 A | | 10/1940 |
| GB | 702781 A | | 1/1954 |
| JP | 11129825 A | * | 5/1999 |
| JP | 11291832 A | * | 10/1999 |

OTHER PUBLICATIONS

Eighteen (18) Photographs of a Dual Force Strut Device used in a Cargo Container, nine (9) of the photographs are in color and nine (9) are in black and white.

* cited by examiner

US 8,096,455 B2

SINGLE FORCE STRUT FOR DUAL SIDED CARGO BOX

CROSS-REFERENCE TO RELATED APPLICATIONS

The present patent application claims the benefit of U.S. Provisional Application No. 60/481,491 filed 9 Oct. 2003. Said application is expressly incorporated herein by reference in its entirety.

BACKGROUND OF INVENTION

An arrangement of the nature of the present disclosure is found in U.S. Pat. No. 5,546,705, which is hereby expressly incorporated herein by reference for purposes of disclosure as part of the present written description.

Vehicular mountable cargo containers, of the variety commonly referred to as cargo boxes, are well known. As in the instant depicted in U.S. Pat. No. 5,546,705, one type of such a carrier is roof mounted, and among those, there is a particular type that the present applicant refers to as being a Dual Sided Opening cargo box.

As described in U.S. Pat. No. 5,546,705, a dual-force strut (or struts) can be used between the two halves of the container that provide a opening spring force when in a range of motion approaching the open configuration and an opposite direction closing spring force when in a range of motion approaching the closed configuration. A distinct transition regarding the direction of the force (from urged extension to urged retraction) occurs therebetween. In the instance of the strut's closing force, that, together with the weight of the top can, instead of assisting the operator, cause the top to undesirably slam shut.

In another aspect, when two struts are used, one at each end of the cargo box as shown in U.S. Pat. No. 5,546,705, the relatively strong forces imposed by the struts can result in the two ends of the box both opening and closing in an imbalanced manner (one gets ahead of the other in the direction that is being urged by the operator, or the two struts apply different direction urgings with respect to each other at the same time; that is, one strut is urging closure while the other strut is urging opening. This detrimentally results in a twisting or torquing of the usually semi-flexible box-top which presents as misbehavior or mal-performance of the product to the operator.

SUMMARY OF THE INVENTION

In at least one exemplary embodiment, the present invention takes the form of a method for providing and controlling operation of a dual sided opening roof mount cargo box that is designed to be installed upon a carrying vehicle such as a automobile. It should be appreciated, however, that the cargo box does not necessarily have to be actually installed upon a vehicle to constitute an example of this embodiment of the invention. The method includes providing a dual sided opening roof mount cargo box having a lid portion releasably hinge-connected at two lateral sides to a bottom portion of the cargo box. With two releasable hinge connections, one on each long-side of the box, by keeping one side hinge-connected and the opposite side's hinge released, the box can be opened at the released side by pivoting the lid portion about the still fastened, opposite hinge connection. This arrangement is known as being dual sided opening in the cargo box carrier technologies (for example, see U.S. Pat. No 5,546,705 referred to hereinabove), and with respect to the present invention, is recited as being for accommodating alternate pivotation at each of the two lateral sides between open and closed configurations of the cargo box.

In keeping therewith, the bottom portion is adapted to be mounted to the carrying vehicle. Such adaptation can take any of a number of forms and includes tightenable assemblies that inter-connect the box to crossbar members of vehicular carried rack systems. The lid portion is exemplarily manufactured from a semi-flexible material sufficiently pliable to permit two opposite end regions thereof to be at different relative distances from the bottom portion of the cargo box during transition between the open and closed configurations. With respect to the background description provided hereinabove, this characteristic can be likened to a twisting or torquing of the lid which users typically wish to avoid, but because of the large size of the lid, and the usual need to construct the same from relatively inexpensive and thin plastic, the construction of the lid itself usually cannot be, or at least will not be, sufficiently fortified to prevent such twist.

For theses reasons, this present embodiment of the invention employs uniquely configured and operable support(s) interposed between the lid and bottom portions of the box. This support is established by providing a pair of spring-biased struts, each operatively interposed between the lid portion and the bottom portion of the cargo box. One each of the pair of spring-biased struts is located at the two opposite end regions of the cargo box.

When an operator opens the box, the support arrangement imposes an expansively directed force on the lid portion, utilizing the pair of spring-biased struts, across a substantial entirety of travel of the lid portion during operator induced movement from the closed configuration to the open configuration of the box, and thereby assisting the operator to smoothly open the cargo box.

In a further development of this exemplary embodiment of the invention, the expansively directed force is controlled, through configuration of the pair of spring-biased struts, to have a magnitude that substantially balances a weight of the lid portion across a range of motion, T, of the lid portion when operating in proximity of the closed configuration. That is to say, as the lid portion is either departing the bottom portion moving toward the open configuration, or is approaching the bottom portion moving toward the closed configuration, the supports are configured so that the force imposed between the lid and bottom portions of the box in the range of motion occurring when the two box halves are proximate one another is substantially equal to the force stemming from the weight of the lid which tends to move the lid to the fully closed position unless opposed; e.g. the struts.

In a complimentary, but different embodiment, the present invention takes the form of a spring-biased strut for a vehicular mountable cargo container or box having a top portion hinge-connected for pivotation relative to a bottom portion of the cargo container. The strut includes two arms operatively connected for pivotation relative to one another through a delimited range of motion. In the illustrated embodiment, such delimitation is affected using stops that impede further progressive motion of one of the arms relative to the other.

A biasing spring is operatively interposed between the two arms, and the biasing spring is configured to be operationally influential on the two arms during transitions between first and second strut orientations that correspond to open and closed configurations of an incorporating vehicular mountable cargo container.

The two arms are adapted so that one each is connectable to the top and bottom portions of the vehicular mountable cargo container thereby enabling the strut to deliver an assisting force for urging the cargo container into the open configuration. The two arms are configured relative to one another, and relative to the biasing spring so that across a substantial entirety of the delimited range of relative motion between the two arms, and which corresponds to a substantial entirety of relative motion between the top and bottom portions of the cargo container when transitioning between the open and closed configurations, the assisting force imparted to the cargo container acts in one rotational direction urging the vehicular mountable cargo container toward the open configuration.

In still a further complementary embodiment, the invention takes the form of a vehicular mountable cargo container having a top portion hinge-connected for pivotation relative to a bottom portion of the cargo container between open and closed configurations. A pair of spring-biased struts are included, each operatively interposed between the top and bottom portions of the vehicular mountable cargo container, and one each of the pair of spring-biased struts located at opposed end regions of the cargo container. Each of the pair of spring-biased struts is configured to exclusively deliver an assisting expansion force between the top and bottom portions of the cargo container for urging the container toward the open configuration. That is to say, the struts do not impose or exert a force between the top and bottom portions tending to close the cargo box.

In at least one development of this embodiment of the invention, the force being purely directed in an opening direction stems from the fact that each of the pair of spring-biased struts is configured to avoid or prevent the delivery or imposition of a closing-assist force between the top and bottom portions of the cargo container that would urge the container toward the closed configuration. In a further aspect of this embodiment of the invention, each of the pair of spring-biased struts is configured to perform in substantial unison, one with the other, thereby urging maintenance of a parallel orientation of the top portion, relative to the bottom portion of the cargo container when transitioned by an operator between the open and closed configurations.

By way of example, this tendency to urge maintenance of the lid portion in an even or horizontal orientation during transition between the open and closed configurations of the box is fostered by the fact that the magnitude of the opening force imparted by the struts is substantially equal to the weight of the lid that is borne thereby, as well of the fact that the strut does not transition between forces that tend to urge the box halves apart toward the open configuration and forces that tend to urge the box halves together toward the closed configuration as exemplified in the disclosure of U.S. Pat. No. 5,546,705. As intimated above, if the two distantly spaced apart struts located at opposite ends of the cargo box were to be permitted to assume configurations in which oppositely directed forces are imposed between the box halves at the two ends of the box, the undesirable torquing or twisting of the lid that has been described relative to known box configurations would likely occur; and it is the avoidance of such misbehavior or mal-performance of the box that the present invention is purposed.

DETAILED DESCRIPTION

Figure 1:
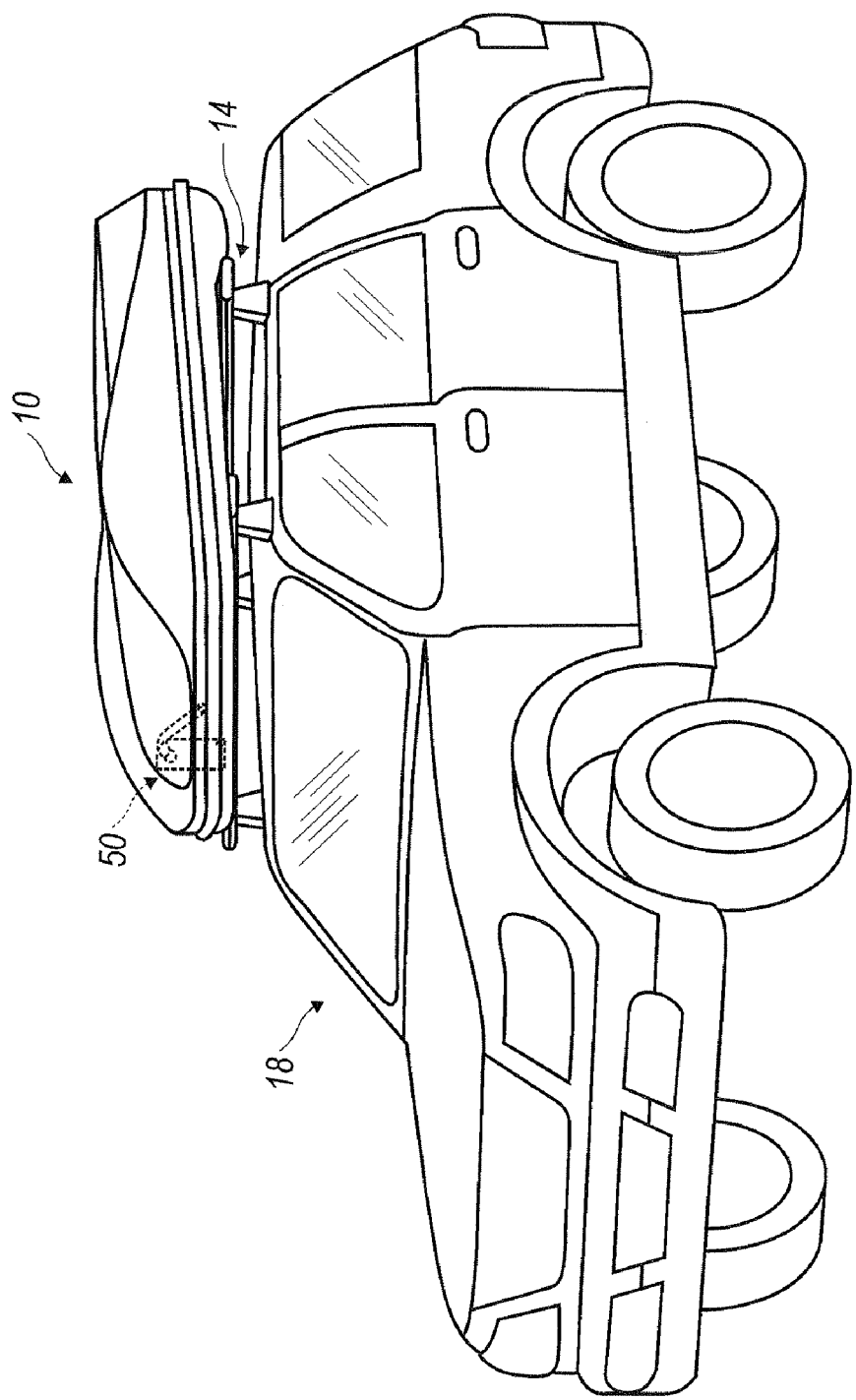
FIG. 1 is a perspective view of a carrying vehicle with a duel sided opening roof mount cargo box installed thereupon, showing one support strut and phantom at a front end thereof.
Figure 2:
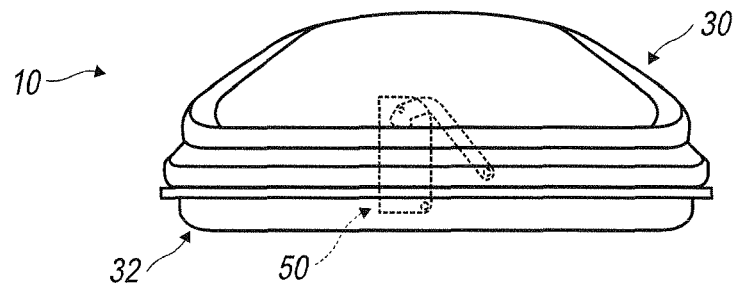
FIG. 2 is a perspective end view of a closed cargo box showing an exemplary support strut in phantom.

Preferred embodiment(s) of the disclosed invention(s) are illustrated and described in the accompanying drawings. Referring to FIG. 1, a perspective view of vehicular mounted cargo container is illustrated demonstrating in phantom, exemplary placement of one of two struts configured according to the teachings of the present invention(s). In FIG. 2, an end perspective view of the vehicular mounted cargo container of FIG. 1 is shown in a closed configuration. An end perspective view of the vehicular mounted cargo container of FIGS. 1 and 2 is shown in FIG. 3 illustrating the dual sided opening feature wherein the right side is open and the top of the container is shown solidly, while the left side is shown in an open configuration with the top of the container depicted in phantom.

Figure 3:
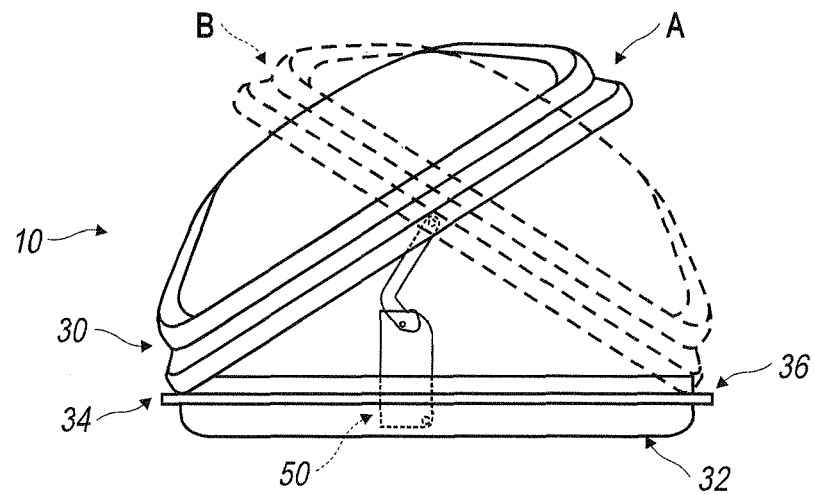
FIG. 3 is a perspective end view of a cargo box open on the right side and substantially revealing an exemplary support strut, as well as an illustration of the cargo box open on the left side, depicted in dashed lines.
Figure 4:
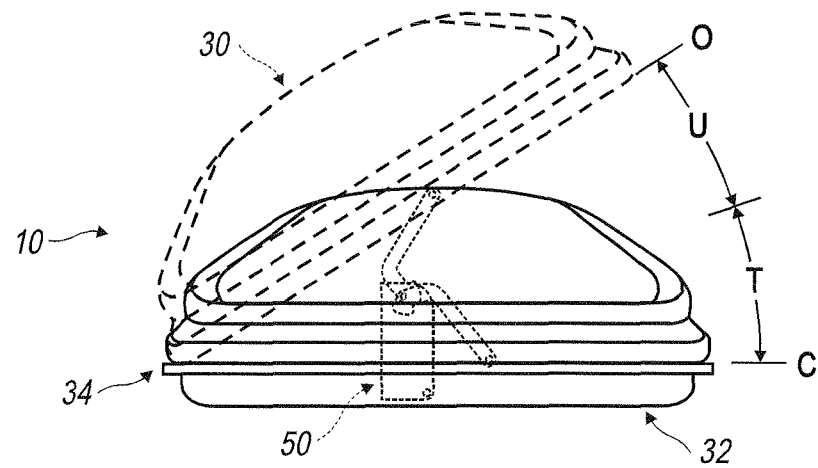
FIG. 4 is a perspective end view of a closed cargo box showing an exemplary support strut in phantom in both open and closed configurations, together with an open configuration of the box shown in phantom, the open (O) and closed (C) configurations of the box are indicated, as well as a transitional (T) range of travel, together with an upward (U) range of travel.
Figure 5:
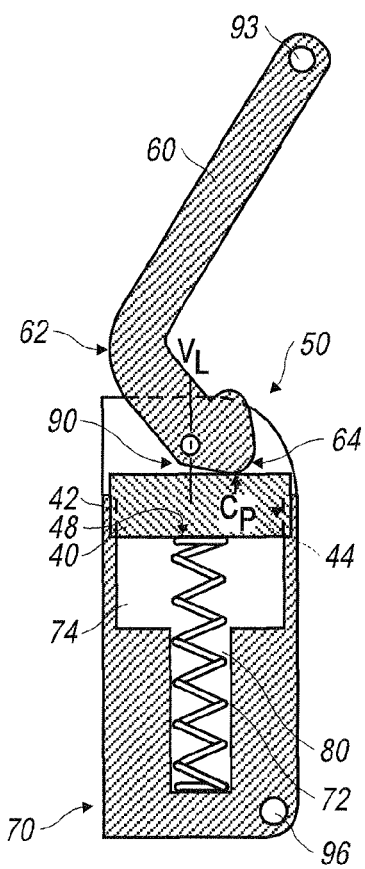
FIG. 5 is a schematic side elevational view of a support strut in a first orientation corresponding to an open configuration of the cargo box.
Figure 6:
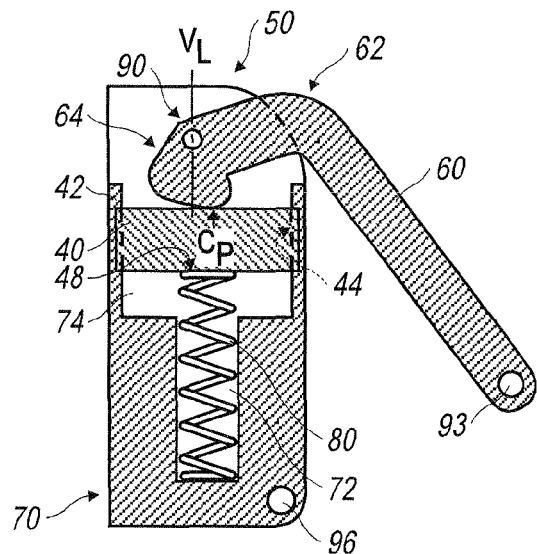
FIG. 6 is a schematic side elevational view of a support strut in a transitional orientation corresponding to a position between the open and closed configuration of the cargo box.
Figure 7:
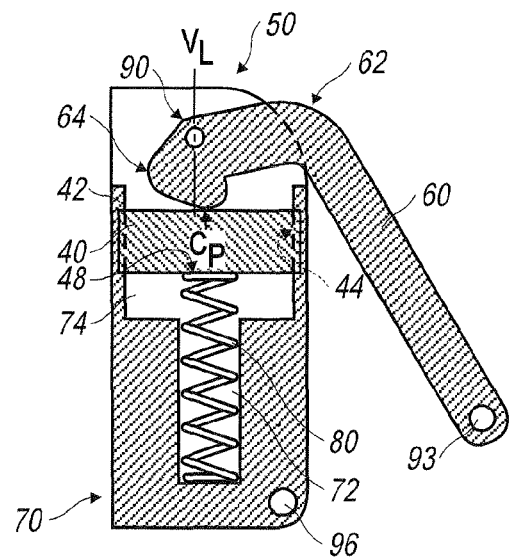
FIG. 7 is a schematic side elevational view of a support strut in a second orientation corresponding to a closed configuration of the cargo box.
Figure 8:
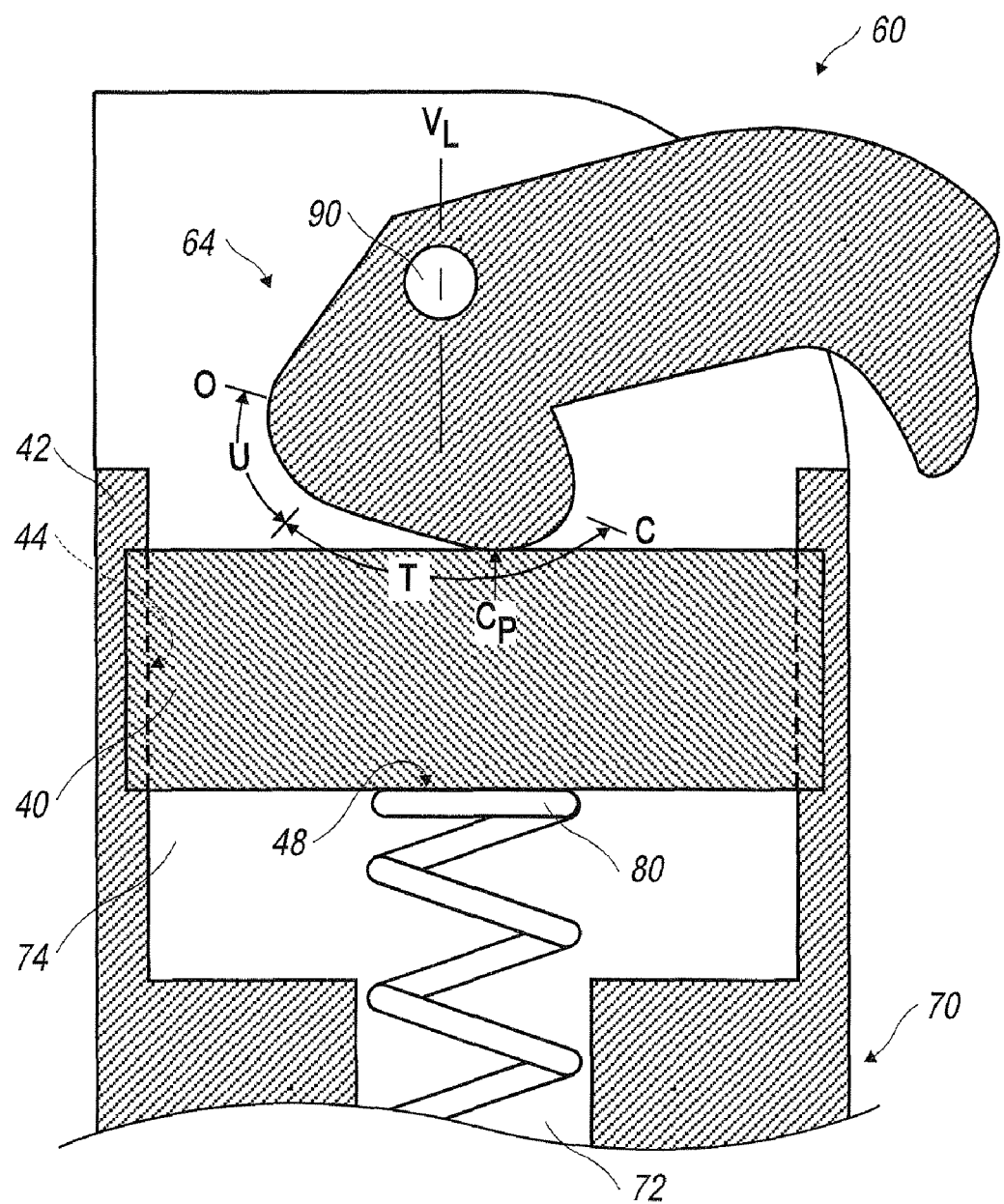
FIG. 8 is a detailed schematic side elevational view of the cooperating portions and elements between the two arms of the support strut substantially as depicted in FIG. 6.

FIG. 4 depicts the vehicular mounted cargo container of FIGS. 1, 2 and 3 hinged at the left side and showing a closed configuration with solid lines and an open configuration shown in phantom. Therein, the open configuration of the container is designated with the letter O and the closed configuration is designated with the letter C. A range of motion over which an upward urging force is imposed by the strut(s) on the container top is designated with the letter U and a range of motion over which a transitional urging force is imposed by the struts on the container top is designated with the letter T. In the "T" range of possible configurations of the container, a force of substantially constant magnitude is preferably exerted by the strut(s) on the container, and the magnitude is preferably insufficient to independently move the container top. In a particularly preferred embodiment, an expansion force is imposed on the container by the strut(s) that is sufficient to assist an operator in opening the top, but not so great as to significantly oppose closing by the operator. FIG. 5 illustrates a first strut orientation corresponding to an open configuration of the container. FIG. 6 illustrates an intermediate strut orientation corresponding to an transitional configuration of the container. FIG. 7 illustrates a second strut orientation corresponding to a closed configuration of the container. FIG. 8 is a detailed view of the cooperative region between the arms (60, 70). A supporting cam surface is defined between the O and C delimiters described hereinabove.

Referring to the invention more generally, FIG. 1 depicts a vehicular mountable cargo container (10) comprising a top portion (30) of the vehicular mountable cargo container (10) hinge-connected at two lateral sides (34, 36) for pivotation relative to a bottom portion (32) of the cargo container between the open (O) and closed (C) configurations. A pair of spring-biased struts (50) are also provided, each operatively interposed between the top (30) and bottom portions (32) of the vehicular mountable cargo container (10). One each of the pair of spring-biased struts (50) is located at opposed end regions of the cargo container. Each of the pair of spring-biased struts (50) is configured to exclusively deliver an assisting expansion force between the top (30) and bottom (32) portions of the cargo container (10) for urging the container towards the open (O) configuration.

Each pair of spring-biased struts (50) is configured to at least avoid, and preferably not to deliver a closing-assist force between the top (30) and bottom (32) portions of the cargo container (10) that urges the container towards the closed (C) configuration.

Still further, each of the pair of spring-biased struts (50) is configured to perform in substantial unison, one with the other, thereby urging maintenance of a parallel orientation of the top portion (30), relative to the bottom portion (32) of the cargo container (10) when transitioned by an operator between the open (O) and closed (C) configurations. Complementarily, the substantially unified movement of the top portion or lid (30) substantially prevents the inducement of torque or twist in the top portion (30) relative to the bottom portion (32) of the cargo container (10) when transitioned by the operator between the open (O) and closed (C) configurations.

A cam surface (64) is provided at one of the two arms and establishes a surficial interaction between the two arms during transitions between the first and second strut orientations. A force communication point ($C_P$) is defined by a point of support of the non-cam surface including arm on the cam-including arm at the cam surface (64), and which moves across the cam surface (64) as the two arms pivot relative to one another between the first and second strut orientations. During such full range of motion, however the force communication point ($C_P$) remains exclusively on one side of a line oriented parallel to a direction of the operationally effective force imposed by the biasing spring between the two arms and intersecting a pivot connection between the two arms. In a preferred embodiment, this line is also oriented substantially parallel to a longitudinal axis ($V_L$) of the non-cam-including arm. In a related aspect, the non-cam-including arm (70) comprises an arm body (72) housing a spring-biased slider therein, the slider being configured for relative reciprocation within the arm body (72) and the slider presenting an engaging surface (48) for establishing a point of contact with the biasing spring (80) and the slider further presenting a reception surface for establishing a sliding point of contact with the cam surface (64) of the cam-including arm (60); the sliding point of contact coinciding with the force communication point ($C_P$). The cam-including arm (60) comprises a cam surface (64), an elongate portion and an elbow (62).

In another embodiment, the invention takes the form of a strut that includes two arms (60, 70) operatively connected for pivotation relative to one another through a delimited range of motion. A biasing spring (80) is operatively interposed between the two arms, and with the biasing spring being configured to be operationally influential on the two arms during transitions between first and second strut orientations that correspond to open and closed configurations of an incorporating vehicular mountable cargo container. The two arms are one each connectable to the top and bottom portions of the vehicular mountable cargo container thereby enabling the strut to deliver an assisting force for urging the cargo container into the open configuration. Pivot connections (93, 96) serve to connect the strut (50) to the top (30) and bottom (32) halves of the container. The two arms are configured relative to one another and the biasing spring so that across a substantial entirety of the delimited range of relative motion between the two arms, and which corresponds to a substantial entirety of relative motion between the top and bottom portions of the cargo container when transitioning between the open and closed configurations, the assisting force imparted to the cargo container acts in one rotational direction urging the vehicular mountable cargo container toward the open configuration.

Delimiters are provided and configured to limit the range of relative motion between the two arms so that throughout the entire range of transitional motion of the strut between the first and second strut orientations, the operationally effective force imposed by the biasing spring between the two arms exclusively urges either one of clockwise or counter clockwise pivotation of the cam surface including atm relative to the non-cam surface including arm. In this regard, the arms (60, 70) are pivotally connected at the connection (90), and counter clock-wise motion of the arm (60) relative to the arm (70) is delimited by a stop, while clock-wise motion of the arm (60) relative to the arm (70) is delimited by another stop. The cam surface and the biasing spring, together with a pivot connection between the two arms establish a capability for an over-center strut orientation at which the direction of the operationally effective force imposed by the biasing spring between the two arms would change between exclusively urging the one of clockwise and counter clockwise pivotation of the cam surface including arm relative to the non-cam surface including arm, but for the delimiters.

Referring to FIGS. 5-8, in the illustrated embodiment the non-cam surface including arm houses a spring-biased (see spring 80), rising and falling slide, carrier or platform (40) that is depicted as being operatively interposed between the two arms (60, 70). A ridge (42) on the arm 70 within an interior space (74) thereof, and a groove (44) on the translating platform (40) exemplarily cooperate as guides for reciprocating motion of the platform within the non-cam surface including arm.

In at least one embodiment, the operationally effective force imposed by the biasing spring between the two arms is constituted as a summation of a plurality of vector forces imposed by the biasing spring between the two arms.

The invention may be alternatively characterized as a method for providing and controlling operation of a dual sided opening roof mount cargo box (10) for a carrying vehicle. The method includes providing a dual sided opening roof mounted cargo box (10) having lid portion (30) releasably hinge-connected at two lateral sides (34, 36) to a bottom portion (32) of the cargo box (10) for alternate pivotation at each of the two lateral sides (34, 36) between open and closed configurations. The bottom portion (32) is adapted to be mounted to a carrying vehicle and the lid portion (30) is manufactured from a semi-flexible material sufficiently pliable to permit two opposite end regions thereof to be at different relative distances from the bottom portion (32) of the cargo box (10) during transition between the open and closed configurations. A pair of spring-biased struts (50) is provided, each operatively interposed between the lid portion (30) and the bottom portion (32) of the cargo box (10), and one each of the pair of spring-biased struts (50) being located at the two opposite end regions of the cargo box. An expansively directed force is exerted on the lid portion (30), utilizing the pair of spring-biased struts (50), across a substantial entirety of travel of the lid portion (30) during operator induced movement from the closed configuration to the open configuration and thereby assisting the operator to smoothly open the cargo box (10).

The expansively directed force is controlled through configuration of the pair of spring-biased struts (50) to have a magnitude that substantially balances a weight of the lid portion (30) across a range of motion (T) of the lid portion (30) when operating in proximity of the closed configuration. This facilitates an operator's even lifting of the lid portion (30) across the range of motion (T) thereby avoiding strut-induced twist in the lid portion (30). Still further, the expansively directed force is controlled to have a magnitude that increases compared to that imposed across the range of motion (T) of the lid portion (30) when operating in proximity of the open configuration (U). Further yet, the expansively directed force is controlled, through configuration of the pair of spring-biased struts (50), to have a substantially zero magnitude when the lid portion (30) is in the closed configuration. This feature avoids fatigue being induced at the strut-engaging portions of the lid portion (30) and bottom portion (32) of the cargo box (10).

What is claimed is:

1. A vehicular mountable cargo container comprising:
   a top portion of said vehicular mountable cargo container hinge-connected for pivotation relative to a bottom portion of the cargo container between open and closed configurations;
   a pair of spring-biased struts, each operatively interposed between said top and bottom portions of said vehicular mountable cargo container, and one each of said pair of spring-biased struts located at opposed end regions of the cargo container; and
   each of said pair of spring-biased struts being configured to exclusively deliver an expansion force between the top and bottom portions of the cargo container for urging the container toward the open configuration and each of said pair of spring-biased struts comprising:
      a cam surface provided at one of two arms of the strut, said cam surface establishing a surficial interaction between said two arms during transitions between first and second strut orientations; and
      a force communication point defined by a point of support of a non-cam surface including arm on a cam-including arm at said cam surface and which moves across the cam surface as said two arms pivot relative to one another between said first and second strut orientations during which said force communication point remains exclusively on one side of a line oriented parallel to a direction of an operationally effective force imposed by said biasing spring between said two arms and intersecting a pivot connection between said two arms.

2. The vehicular mountable cargo container as recited in claim 1, wherein each of said pair of spring-biased struts is configured to avoid delivering a closing-assist force between the top and bottom portions of the cargo container that urges the container toward the closed configuration.

3. The vehicular mountable cargo container as recited in claim 1, wherein each of said pair of spring-biased struts is configured to prevent delivering a closing-assist force between the top and bottom portions of the cargo container that urges the container toward the closed configuration.

4. The vehicular mountable cargo container as recited in claim 1, wherein each of said pair of spring-biased struts is configured to perform in substantial unison, one with the other, thereby urging maintenance of a parallel orientation of said top portion, relative to said bottom portion of said cargo container when transitioned by an operator between the open and closed configurations.

5. The vehicular mountable cargo container as recited in claim 1, wherein each of said pair of spring-biased struts is configured to perform in substantial unison, one with the other, thereby preventing an inducement of said top portion to torque, relative to said bottom portion of said cargo container when transitioned by an operator between the open and closed configurations.

6. A method for providing and controlling operation of a dual sided opening roof mount cargo box for a carrying vehicle, said method comprising:
   providing a dual sided opening roof mount cargo box having a lid portion releasably hinge-connected at two lateral sides to a bottom portion of said cargo box for alternate pivotation at each of the two lateral sides between open and closed configurations, said bottom portion being adapted to be mounted to a carrying vehicle and said lid portion being manufactured from a semi-flexible material sufficiently pliable to permit two opposite end regions thereof to be at different relative distances from the bottom portion of the cargo box during transition between the open and closed configurations;
   providing a pair of spring-biased struts, each operatively interposed between said lid portion and said bottom portion of said cargo box, and one each of said pair of spring-biased struts being located at said two opposite end regions of said cargo box;
   imposing an expansively directed force on said lid portion, utilizing said pair of spring-biased struts, across a substantial entirety of travel of said lid portion during operator induced movement from said closed configuration to said open configuration and thereby smoothly urging the cargo box open;
   controlling said expansively directed force, through configuration of said pair of spring-biased struts, to have a magnitude that substantially balances a weight of said lid portion across a range of motion of said lid portion when operating in proximity of said closed configuration and wherein each of said pair of spring-biased struts further comprises:
      two arms operatively connected for pivotation relative to one another through a delimited range of motion;
      a biasing spring operatively interposed between said two arms for operational influence during transition between first and second strut orientations that correspond to said open and closed configurations of said cargo box;
      said two arms connected, one each, to said lid and bottom portions of said cargo box thereby enabling said strut to deliver said expansively directed force for urging the cargo box into the open configuration;
      a cam surface provided at one of said two arms and thereby establishing a cam-including arm and a non-cam-including arm, said cam surface establishing a surficial interaction between said two arms during transitions between said first and second strut orientations;
      delimiters configured to limit the range of relative motion between said two arms so that throughout the entire range of transitional motion of said strut between said first and second strut orientations, said operationally effective force imposed by said biasing spring between said two arms urges exclusively unidirectional pivotation of said cam-including arm relative to said non-cam-including arm; and a force communication point being defined by a point of support of said non-cam-including arm on said cam-including arm at said cam surface and which moves across said cam surface as said two arms pivot relative to one another between said first and second strut orientations during which said force communication point remains exclusively on one side of a line oriented parallel to a direction of said operationally effective force imposed by said biasing spring between said two arms and intersecting a pivot connection between said two arms.

7. The method as recited in claim 6, wherein each of said pair of spring-biased struts further comprises:

said non-cam-including arm comprising an arm body housing a spring biased slider therein, said slider being configured for relative reciprocation within said arm body and said slider presenting a reception surface for establishing a sliding point of contact with said cam surface of said cam-including arm; said sliding point of contact coinciding with said force communication point.

8. A method for providing and controlling operation of a dual sided opening roof mount cargo box for a carrying vehicle, said method comprising:

providing a dual sided opening roof mount cargo box having a lid portion releasably hinge-connected at two lateral sides to a bottom portion of said cargo box for alternate pivotation at each of the two lateral sides between open and closed configurations, said bottom portion being adapted to be mounted to a carrying vehicle and said lid portion being manufactured from a semi-flexible material sufficiently pliable to permit two opposite end regions thereof to be at different relative distances from the bottom portion of the cargo box during transition between the open and closed configurations;

providing a pair of spring-biased struts, each operatively interposed between said lid portion and said bottom portion of said cargo box, and one each of said pair of spring-biased struts being located at said two opposite end regions of said cargo box;

imposing an expansively directed force on said lid portion, utilizing said pair of spring-biased struts, across a substantial entirety of travel of said lid portion during operator induced movement from said closed configuration to said open configuration and thereby smoothly urging the cargo box open;

controlling said expansively directed force, through configuration of said pair of spring-biased struts, to have a magnitude that substantially balances a weight of said lid portion across a range of motion of said lid portion when operating in proximity of said closed configuration; and wherein each of said pair of spring-biased struts comprises:

two arms operatively connected for pivotation relative to one another through a delimited range of motion;

a biasing spring operatively interposed between said two arms for operational influence during transition between first and second strut orientations that correspond to said open and closed configurations of said cargo box;

said two arms connected, one each, to said lid and bottom portions of said cargo box thereby enabling said strut to deliver said expansively directed force for urging the cargo box into the open configuration;

a cam surface provided at one of said two arms and thereby establishing a cam-including arm and a non-cam-including arm, said cam surface establishing a surficial interaction between said two arms during transitions between said first and second strut orientations; and a force communication point being defined by a point of support of the non-cam-including arm on said cam-including arm at said cam surface and which moves across the cam surface as said two arms pivot relative to one another between said first and second strut orientations during which said force communication point remains exclusively on one side of a line oriented parallel to a direction of said operationally effective force imposed by said biasing spring between said two arms and intersecting a pivot connection between said two arms.

9. The method as recited in claim 8, further comprising:

controlling said expansively directed force, through configuration of said pair of spring-biased struts, to have a magnitude that increases compared to that imposed across the range of motion of said lid portion when operating in proximity of said open configuration.

10. The method as recited in claim 8, further comprising:

controlling said expansively directed force, through configuration of said pair of spring-biased struts, to have a substantially zero magnitude when said lid portion is in said closed configuration and thereby avoiding fatigue inducement at the strut-engaging portions of the lid portion and bottom portion of the cargo box.

11. The method as recited in claim 8, wherein each of said pair of spring-biased struts further comprises:

a cam surface provided at one of said two arms and thereby establishing a cam-including arm and a non-cam-including arm, said cam surface establishing a surficial interaction between said two arms during transitions between said first and second strut orientations; and delimiters configured to limit the range of relative motion between said two arms so that throughout the entire range of transitional motion of said strut between said first and second strut orientations, said operationally effective force imposed by said biasing spring between said two arms urges exclusively unidirectional pivotation of said cam-including arm relative to said non-cam-including arm.

12. The method as recited in claim 8, wherein each of said pair of spring-biased struts further comprises:

said operationally effective force imposed by said biasing spring between said two arms being a summation of a plurality of vector forces imposed by said biasing spring between said two arms.

13. The method as recited in claim 8, wherein each of said pair of spring-biased struts is configured to prevent the provision of a closing-assist force between said lid portion and said bottom portion that urges said cargo box toward the closed configuration.

14. The method as recited in claim 8, wherein each of said pair of spring-biased struts is configured to perform in substantial unison, one with the other, thereby urging maintenance of a parallel orientation of said lid portion, relative to said bottom portion of said cargo box when transitioned by an operator between the open and closed configurations.

15. The method as recited in claim 8, wherein each of said pair of spring-biased struts is configured to perform in substantial unison, one with the other, thereby preventing an inducement of said lid portion to torque, relative to said bottom portion of said cargo box when transitioned by an operator between the open and closed configurations.

16. The method as recited in claim 8, wherein each of said pair of spring-biased struts further comprises:
said non-cam-including arm comprising an arm body housing a spring biased slider therein, said slider being configured for relative reciprocation within said arm body and said slider presenting a reception surface for establishing a sliding point of contact with said cam surface of said cam-including arm; said sliding point of contact coinciding with said force communication point.

17. The method as recited in claim 16, wherein each of said pair of spring-biased struts further comprises:
said line oriented parallel to the direction of said operationally effective force imposed by said biasing spring between said two arms and intersecting a pivot connection between said two arms being further oriented substantially parallel to a longitudinal axis of the non-cam-including arm.

\* \* \* \* \*